United States Patent [19]

Gaylord

[11] 4,012,575

[45] Mar. 15, 1977

[54] HOMOPOLYMERS OF CIS-5-NORBORNENE-2,3-DICARBOXYLIC ANHYDRIDES

[75] Inventor: Norman G. Gaylord, New Providence, N.J.

[73] Assignee: Borg-Warner Corporation, Chicago, Ill.

[22] Filed: Apr. 30, 1975

[21] Appl. No.: 573,194

Related U.S. Application Data

[63] Continuation-in-part of Ser. No. 470,705, May 16, 1974, abandoned.

[52] U.S. Cl. .............................. 526/271; 526/230; 526/281
[51] Int. Cl.$^2$ .............. C08F 134/00; C08F 234/00
[58] Field of Search ................ 260/78.4 R, 78.5 R; 526/271, 227, 283, 230, 281

[56] References Cited

UNITED STATES PATENTS

| 3,330,815 | 7/1967 | McKeon et al. ................... 260/93.1 |
| 3,494,897 | 2/1970 | Reding et al. ..................... 260/78.5 |

*Primary Examiner*—John Kight, III
*Attorney, Agent, or Firm*—Richard J. Schlott

[57] ABSTRACT

Novel homopolymers of the exo and endo cyclic adducts of maleic anhydride and cyclic conjugated dienes such as cyclopentadiene. The homopolymers are prepared by heating the cyclic adduct in the presence of a free radical catalyst, such as a peroxygen compound, at a temperature at which endo-exo isomerization does not occur during the reaction period and the catalyst has a half-life of no more than 2 hours.

9 Claims, No Drawings

HOMOPOLYMERS OF CIS-5-NORBORNENE-2,3-DICARBOXYLIC ANHYDRIDES

This application is a continuation-in-part of copending Ser. No. 470,705, filed May 16, 1974, now abandoned.

This invention relates to novel polymers of the cyclic adducts of maleic anhydride and certain conjugated dienes, and more particularly to novel polymers of the cyclic adducts of maleic anhydride and cyclic conjugated dienes. The invention also pertains to a process for preparing such polymers.

The reaction of maleic anhydride with cyclic conjugated dienes such as cyclopentadiene and the isomeric methylcyclopentadienes yields the equimolar cyclic Diels-Alder adducts, endo-cis-5-norbornene-2,3-dicarboxylic anhydride and the 1-, 5- and 7-methyl substitued homologues, respectively. The endo maleic anhydridecyclopentadiene adduct, m.p. 165° C., undergoes isomerization at elevated temperatures to the exo adduct, m.p. 143° C. The isomerization takes place in the melt (D. Craig, J. Amer. Chem. Soc., 73, 4889 (1951)) or in solution (C. Ganter, U. Scheidegger, and J. D. Roberts, J. Amer. Chem. Soc., 87, 2771 (1965)). When either isomer is heated at a sufficiently elevated temperature, isomerization occurs and a mixture of both isomers is obtained. When the heating period is extended the equilibrium composition for that temperature is established. The various endo maleic anhydride-methylcyclopentadiene adducts, prepared from the 1-, 2- and 5-methylcyclopentadienes, similarly undergo isomerization to a mixture of the exo and endo adducts at elevated temperatures (V. A. Mironov, T. M. Fadeeva, A. U. Stepaniantz, and A. A. Akhrem, Tetrahedron Letters, 5823 (1966).

One object of the present invention is to provide novel polymers of the maleic anhydride-conjugated diene cyclic adducts.

Another object of the present invention is to provide novel polymers of the maleic anhydride-cyclic conjugated diene cyclic adducts.

A further object of the present invention is to provide novel polymers of the endo maleic anhydride-cyclic conjugated diene cyclic adducts.

Another object of the present invention is to provide novel ploymers of the exo maleic anhydride-cyclic conjugated diene cyclic adducts.

A still further object of the present invention is to provide a process for preparing such novel polymers.

These and other objects of the present invention will become apparent from the ensuing description and illustrative embodiments.

In accordance with the present invention it has now been found that polymers may be obtained by subjecting the Diels-Alder adducts of maleic anhydride and cyclic conjugated dienes to temperatures at which little or no isomerization occurs during the reaction period, in the presence of a free radical precursor.

The cyclic adducts which are useful for preparing the novel polymers of this invention comprise the equimolar adducts of maleic anhydrideand the cyclic conjugated dienes, cyclopentadiene and the isomeric methylcyclopentadienes. The exo and endo adducts as well as mixtures thereof are capable of undergoing polymerization by the process of the present invention.

The reaction may be carried out in bulk, i.e., in the molten state, or in the presence of an organic solvent which is inert towards the anhydride functionality in the adduct, i.e., a solvent which does not contain reactive hydrogen atoms such as slcohols, mercaptans or amines.

The required free radical precursors may be conventional polymerization catalysts, including azo compounds, dialkyl peroxides, diacyl peroxides, peresters, hydroperoxides, etc., e.g., azobisisobutyronitrile, benzoyl peroxide, tert-butyl peroxpivalate, tert-butyl peracetate, tert-butyl perbenzoate, tert-butyl hydroperoxide, etc. The free radical catalyst is used at concentrations of 2–10% by weight based on adduct, and preferably at temperatures where the half-life is no more than 2 hours.

In accordance with one method of carrying out the present invention, the catalyst is added continuously or intermittently over a period of time, to the molten or liquid adduct which is being maintained at the desired reaction temperature. The catalyst may also be added as a solution in an inert solvent to the liquid adduct or a solution thereof at the desired temperature. When the reaction medium is a solvent for the polymer, the latter may be precipitated therefrom with a non-solvent. When the medium is a non-solvent for the polymer, the latter is precipitated during the course of the reaction.

When the reaction is carried out in bulk, the polymer begins to precipitate from the reaction mixture shortly after the reaction is initiated by the addition of the catalyst. When the reaction is completed the mixture is diluted with acetone to dissolve the polymer, which is then precipitated with chloroform. Other solvent - non-solvent compositions may be used to isolate the polymer. The polymer is soluble in methyl ethyl ketone, pyridine and dimethylformamide as well as acetone and insoluble in carbon tetrachloride, chlorobenzene, carbon disulfide, hexane and benzene as well as chloroform. It will be understood that the exact method of recovering the polymer from the reaction mixture is not a critical feature of this invention, and that any of the known procedures may be readily employed.

The reaction occurs rapidly during the period of catalyst addition and is virtually complete shortly thereafter. Although the reaction may be terminated by cooling at that time, the reaction mixture is generally heated for an additional period to ensure maximum conversion.

The temperature employed in the preparation of the novel polymers of the present invention is a temperature at which little or no endo-exo isomerization occurs during the period of catalyst addition. Thus, the rate of isomerization is about 1% per hour at 150° C. and 30% per hour at 170° C. When the polymerization is carried out at a high temperature, the catalyst is added over a short period of time so that polymerization is completed before isomerization occurs to any significant extent. In general, the temperature employed in carrying out the present invention will range from about 50° to 170° C. and preferably about 70° to 160° C. Either atmospheric or superatmospheric pressures may be employed.

The polymerization of the exo adduct of maleic anhydride and cyclopentadiene, m.p. 143° C., may be carried out in the molten state, in a solvent for the adduct and the polymer or in a solvent for the adduct which is a non-solvent for the polymer. The polymerization of the endo adduct, m.p. 165° C., may be carried out in a similar manner. The mixture of endo and exo adducts, m.p. 105° C., obtained on heating either the endo or exo adducts at 190° C. for at least 1.5 hours, may be polymerized in the molten state or in a solvent for the adducts. The mixtures obtained by isomerizing either of the adducts for a shorter time at 190° C., or at a different temperature, have melting points which depend upon the relative amounts of endo and exo adducts in the mixture and may be polymer— in a similar manner.

The homopolymer of endo-5-norbornene-2,3-dicarboxylic anhydride is soluble in dioxane and acetone. The homopolymer of exo-5-norbornene-2,3-dicarboxylic anhydride is insoluble in dioxane and soluble in acetone. The reaction product obtained from the polymerization of the mixture of endo and exo adducts, in accordance with the process of the present invention, may be separated into dioxane-soluble and dioxane-insoluble fractions, representing the homopolymers of the endo and exo adducts, respectively.

The NMR spectrum of the homopolymer of endo-5-norbornene-2,3-dicarboxylic anhydride, measured at 60 MHz in acetone-$d_6$ using tetramethylsilane as internal standard at 60° C., contains absorption peaks at 6.3, 6.9, 7.3 and 8.2 $\tau$. The NMR spectrum of the homopolymer of the exo adduct has absorption peaks at 6.9, 7.3 and 8.3 $\tau$, but lacks the absorption peak at 6.3 $\tau$. The presence of catalyst residues in the polymers is indicated by the presence of appropriate absorption peaks, e.g., at 8.8 $\tau$ when the polymerization is carried out in the presence of tert-butyl peracetate and at 2.3–2.9 $\tau$ when the polymerization is carried out in the presence of benzoyl peroxide. Little or no absorption at 4.0 $\tau$ indicates that the polymers have an essentially saturated structure and any unsaturation, if present, is probably present as an end group.

Integration of the NMR absorption peaks indicates that the polymers contain equimolar amounts of units derived from cyclopentadiene and maleic anhydride, in agreement with the composition of the adducts and the elemental analyses of the polymers.

The absence of unsaturation is confirmed from the infrared spectra of the homopolymers of the endo and exo adducts, recorded as films cast on sodium chloride plates from acetone solution. The spectra show absorption peaks at 1760 and 1835 cm$^{-1}$, characteristic of copolymers containing maleic anhydride. Weak peaks are present at 1360 and 1440 cm$^{-1}$ and strong peaks at 1220, 1080, 940 and 900 cm$^{-1}$. The absence of absorption peaks at 1640 and 3050 cm$^{-1}$ indicates the absence of double bonds. An absorption peak at 730 cm$^{-1}$, characteristic of unsaturated polymers derived from cyclopentene and cyclopentadiene and present in the spectra of endo and exo 5-norbornene-2,3-dicarboxylic anhydride, is absent in the spectra of the polymers of this invention, indicating the absence of unsaturation.

The invention will be more fully understood by reference to the following illustrative embodiments.

EXAMPLE I

The Diels-Alder adduct from cyclopentadiene and maleic anhydride, endo-cis-5-norbornene-2,3-dicarboxylic anhydride, m.p. 165° C., was heated at 220° C. for 4 hours. On cooling the product solidified with a melting point of 101° C. The crude reaction product was recrystallized from benzene three times to isolate exo-cis-5-norbornene-2,3-dicarboxylic anhydride, m.p. 141° C., in 25% yield.

The endo adduct was heated at 190° C. for 1.5 hours to yield a mixture of endo and exo adducts with a melting point of 105° C. Gas chromatographic analysis showed that the mixture contained 55% of the exo adduct and 45% of the endo adduct.

EXAMPLE II

A solution containing 2.0 g. of the endo cyclopentadiene-maleic anhydride adduct in 2.0 g. of monochlorobenzene was placed in a long test tube which was then sealed with a rubber serum cap. The tube was placed in an oil bath at 120° C. A total of 0.3 ml. of tert-butyl peracetate (70% solution in benzene) was added incrementally over a period of 20 minutes. After an additional 40 minutes at 120° C., the heterogeneous mixture was cooled and chloroform was added to precipitate any polymer still in the solution. After the precipitate was filtered and dried in vacuo, the yield of polymer was 50%. Removal of the solvents from the filtrate in vacuo resulted in recovery of the pure endo adduct, indicating the absence of isomerization during the polymerization. The molecular weight of the homopolymer from the endo adduct was 2850 (cryoscopy in dioxane). The polymer had a softening point of 320° C. and elemental analyses in agreement with the theoretical analyses, taking into consideration an end group derived from the catalyst.

Calcd. for $C_9H_8O_3$: C, 65.85; H, 4.88; 0, 29.27. Found: C, 64.33; H, 5.41; O, 30.26.

Infrared and NMR analyses indicated the absence of unsaturation.

EXAMPLE III

The procedure described in Example II was repeated using 2.0 g. of the exo cyclopentadiene-maleic anhydride adduct in 2.0 g. monochlorobenzene. A total of 0.3 ml. of tert-butyl peracetate was added over 20 minutes to the solution which was maintained at 120°–125° C. After an additional 40 minutes at 120° C., the polymer was isolated in the manner described in Example II. The yield of polymer was 72% and its softening point was 320° C. The elemental analyses were in agreement with the theoretical analyses. The infrared and NMR analyses indicated the absence of unsaturation. The osmotic molecular weight of the polymer was 990. The recovery of the exo adduct from the reaction mixture and the absence of the endo adduct, indicated the absence of isomerization during the polymerization.

EXAMPLE IV

The procedure described in Example II as repeated using 2.0 g. of the endo cyclopentadiene-maleic adduct in 2.0 g. of dioxane. A total of 0.3 m. of tert-butyl peracetate was added incrementally over 20 minutes while the temperature was maintained at 120°C. After an additional 40 minutes at 120° C., chloroform was added to the homogeneous solution to precipitate the polymer. The yield of the homopolymer of the endo adduct was 36%.

EXAMPLE V

After 2.0 g. of the mixture of endo and exo adducts of cyclopentadiene and maleic anhydride, m.p. 105° C., prepared at 190° C. as described in Example I, was placed in a long test tube, the latter was sealed with a rubber serum cap and placed in an oil bath at 105° C. A total of 0.3 ml. of tert-butyl peracetate was added in six equal increments over a period of 20 minutes. The mixture was maintained at 105° C. for an additional 40 minutes and then cooled. After the mixture was diluted with chloroform, the precipitate was filtered and dried in vacuo. The polymeric product was obtained in yield of 10%.

EXAMPLE VI

The procedure described in Example V was repeated using 2.0 g. of the mixture of endo and exo cyclopentadiene-maleic anhydride adducts, m.p. 105° C., maintaining the reaction tempreature at 120° C. and adding 0.3 ml. of tert-butyl peracetate over 20 minutes. The product isolated by the procedure described in Example V was obtained in yield of 52.5%. After purification by solution in acetone and precipitation with chloroform, the polymeric material had a softening point of 320° C.

EXAMPLE VII

The procedure described in Example V was repeated using 8.0 g. of the mixture of 45% endo and 55% exo cyclopentadiene-maleic anhydride adducts, m.p. 105° C., and adding 0.3 ml. of tert-butyl peracetate over 20 minutes while maintaining the temperature at 105° C. The product as isolated as described in Example V in 18% yield. After extraction with dioxane for 2 hours, the product was separated into 48% of a dioxane-soluble fraction and 52% of a dioxane-insoluble fraction. The dioxane-soluble polymer as precipitated with chloroform and was identified as the homopolymer of the endo adduct, by the presence of the 6.3 absorption peak in the NMR spectrum. The dioxane-insoluble polymer, after washing with chloroform and drying, had a softening point of 330° C. and was identified as the homopolymer of the exo adduct.

EXAMPLE VIII

The procedure described in Example V was repeated using 8.0 g. of the mixed endo and exo adducts of cyclopentadiene and maleic anhydride, m.p. 105° C., and adding 0.45 ml. of tert-butyl peracetate over 20 minutes at 120° C. The polymeric product, obtained in 24% yield, was separated into 55% of dioxane-soluble fraction and 45% of dioxane-insoluble fraction.

EXAMPLE IX

The procedure described in Example V was repeated using a solution of 2.0 g. of the mixture of endo and exo cyclopentadiene-maleic anhydride adducts, m.p. 105° C., in 2.0 g. of monochlorobenzene, maintaining the reaction temperature at 120° C. and adding 0.3 ml. of tert-butyl peracetate over a period of 20 minutes. A precipitate was formed as the reaction was being carried out. After a 1 hour reaction period, the mixture was cooled, and the product was isolated by filtration. After drying in vacuo, the polymeric product was obtained in a total yield of 65%.

EXAMPLE X

The endo cyclopentadiene-maleic anhydride adduct was charged into a tube which was then sealed with a rubber serum cap. After 0.3 ml. of xylene as introduced into the tube, the latter was placed in an oil bath maintained at 146°-147° C. A total of 0.3 ml. of tert-butyl peracetate (70% solution in benzene) was injected into the tube in 6 portions of 0.05 ml. each over a period of 20 minutes. At the end of 1 hour the reaction mixture as a yellow viscous gel which was dissolved in warm acetone, heated with activated carbon and filtered into carbon tetrachloride. After washing and drying, the homopolymer of the endo adduct as obtained in 50% yield.

EXAMPLE XI

The procedure described in Example X was repeated using 2.0 g. of the exo cyclopentadiene-maleic anhydride adduct, 0.3 ml. xylene and adding 0.3 ml. of tert-butyl peracetate over a period of 20 minutes. After a 1 hour reaction period at 146°-147° C., the homopolymer of the exo adduct was obtained in 65% yield.

The novel polymers of this invention may be converted into numerous derivatives by any of the known reactions for organic compounds containing anhydride groups. Thus, for example, the polymers containing anhydride groups may be hydrolyzed to produce recurring units which are dicarboxylic acid and which in turn may be converted to mono- or dicarboxylic acid salts. The carboxylic acid groups may be esterified with monohydric alcohols or diazoalkanes to yield monoester acids or diesters, respectively. The anhydride groups may be reacted with monohydric alcohols to produce monoester acids or diesters, depending upon the relative amount of alcohol and the reaction conditions. The anhydride groups may also be reacted with amines to yield monoamide acids or diamides or imides and with ammonium hydroxide to produce the monoor diammonium salts as well as the monamide-monoammonium salt. Since the polymer contains numerous anhydride groups, by controlling the quantity of reagent it is possible to control the extent of reaction.

The absence of unsaturation in the polymers of this invention is further confirmed by examination of the infrared and NMR spectra of the ester derivatives of the anhydride polymer. Thus, the infrared spectra of the monomethyl and dimethyl ester polymers resemble that of the anhydride polymer except that the anhydride absorption is replaced by the carbonyl absorption at 1720 $cm^{-1}$, accompanied by the hydroxyl absorption of 3300 $cm^{-1}$, and the peak at 1080 $cm^{-1}$ is shifted to 1035 $cm^{-1}$. The absence of unsaturation is evident from the 730, 1600 and 3000 $cm^{-1}$ regions.

The NMR spectra of the monomethyl and dimethyl ester polymers show no absorption below 6.0$\tau$. The absence of a peak at 4.0 $\tau$ indicates the absence of unsaturation. Integration of the methoxy resonance in the monomethyl and dimethyl ester polymers confirm the presence of equimolar units derived from cyclopentadiene and maleic ester, in agreement with the elemental analyses.

The novel homopolymers of the present invention may be employed as thickeners, stabilizers, dispersants, binders, emulsifiers, textile and paper sizing agents, leveling agents in floor polishes, etc.

The polyanhydrides or half acids may be utilized to cure epoxy, alkyd, amine-formaldehyde, thermosetting acrylic and other resins containing reactive functional groups or may themselves be cured by agents containing such functionality.

While particular embodiments of this invention are shown above, it will be understood that the invention is obviously subject to variations and modifications without departing from its broader aspects.

What is claimed is:

1. A process for the preparation of homopolymers of cyclic adducts derived from maleic anhydride and a cyclic conjugated diene, said diene selected from the group consisting of cyclopentadiene and methyl cyclopentadiene which comprises heating said adduct at a temperature at which endo-exo isomerization does not occur during the reaction period, said temperature being not less than 50° C., and adding thereto a free radical precursor having a half life of no more than 2 hours.

2. The process of claim 1 wherein said adduct is the endo isomer.

3. The process of claim 1 wherein said adduct is a mixture of the endo and exo isomers.

4. The process of claim 1 wherein said adduct is the exo isomer.

5. The process of claim 1 wherein said free radical precursor is a peroxygen compound.

6. The process of claim 1 wherein said temperature is between 50° and 170° C.

7. The process of claim 1 wherein said temperature is above 100° C.

8. A homopolymer of the cyclic adduct derived from maleic anhydride and cyclic conjugated diene selected from the group consisting of cyclopentadiene and methyl cyclopentadiene, prepared by the process comprising heating said adduct at a temperature at which endo-exo isomerization does not occur, said temperature being not less than 50° C., and adding thereto a free radical precursor having a half life of no nore than 2 hours.

9. The homopolymer of claim 8 wherein the free radical precursor is a peroxygen compound.

* * * * *